Feb. 10, 1948.    R. D. ACTON    2,435,563
TRACTOR MOUNTED IMPLEMENT
Filed Sept. 1, 1944
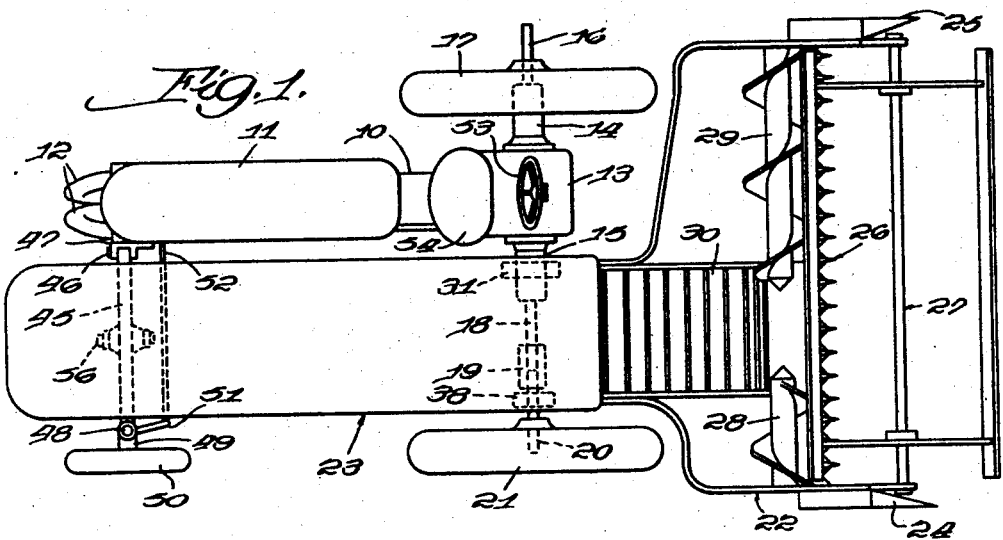
Inventor:
Russel D. Acton.
By Pamel Pippel
Atty.

Patented Feb. 10, 1948

2,435,563

UNITED STATES PATENT OFFICE 2,435,563

TRACTOR-MOUNTED IMPLEMENT

Russel D. Acton, Chicago, Ill., assignor to International Harvester Company, a corporation of New Jersey Application September 1, 1944, Serial No. 552,313

8 Claims. (Cl. 56—10)

1

This invention relates to tractor-mounted implements. More specifically it relates to mounting implements on an offset tricycle type of tractor.

The trend in the design of agricultural implements has been to mount the implement wherever possible directly on a tractor to reduce the frame structure required and to provide self-propelled machines which are more easily handled in negotiating turns. It has also been found that a tractor can support and operate a heavier implement when directly mounted on the tractor than when the implement is pulled in trail-behind relation. The weight of the implement replaces the heavy wheel weights required on pneumatic tired tractors to give sufficient traction for pulling a heavy implement.

With the large machines such, for example, as harvester threshers, the conventional tractors do not have available space for mounting the machine. The present invention has to do with providing a modification of a tricycle tractor and in associating an implement with the modified construction.

The principal object of the present invention is to provide an improved tractor-implement combination particularly adapted to supporting heavy structures and structures of considerable width and length. Another principal object is the provision of supporting means on a live axle extension of a tricycle tractor whereby a greater width may be obtained for mounting implements. Another principal object is the mounting of a harvester thresher on an offset tricycle tractor with the thresher part mounted on spaced supports on an axle housing and on a live axle extension. A subsidiary object is to provide the harvester part with cutting mechanism extending beyond the tread lines of the tractor wheels whereby a machine is provided capable of operating in an uncut field without running over any uncut grain. Another object is the provision of an auxiliary supporting means at the front end of a tricycle tractor whereby additional load carrying support may be provided for a heavy machine mounted alongside the tractor. A more specific subsidiary object is to provide two spaced supports at one end of the tractor provided for pivoting on a transverse axis and a single support at the other end of the tractor, said support being carried on a floating wheel supported member. The above objects and others, which will be apparent from the description to follow, are attained by a construction such as shown in the drawings, in which:

Figure 1 is a plan view of an offset tricycle tractor with a harvester thresher mounted thereon in accordance with the invention;

Figure 2 is a transverse section showing the extended axle side of the tractor of Figure 1, with a portion of the thresher part of the harvester thresher;

Figure 3 is a section taken on the line 3 of Figure 2;

Figure 4 is a section taken on the line 4 of Figure 2; and

Figure 5 is a plan view of the front end of the tractor as shown in Figure 1, with a modified supporting means for a load-supporting structure.

In the drawings, the tractor and the harvester thresher have been diagrammatically illustrated without showing all the details thereof. The invention resides in the geographic arrangement of these two machines with respect to each other along with details in the mounting structure which have been more fully illustrated in Figures 2, 3, and 4.

The tractor illustrated is similar to the conventional type now in wide use, the primary difference being that it has been adapted for operation in the reverse direction. The tractor will, however, be described as conventionally spoken of, that is, with the traction wheels at the rear and the steerable wheels at the front. In the application disclosed, the tractor is operated in a reverse direction. The tractor shown has a narrow body portion 10, a hood structure 11, front steerable wheels 12, a rear body portion 13, a laterally extending axle housing structure 14 extending from the rear body portion 13, and a similar rear axle housing structure 15 extending from the other side of the rear body portion 13.

A live drive axle 16 extends from the housing structure 14 carrying a traction wheel 17 which is closely spaced to the body 10 of the tractor. The axle housing structure 15 carries a live drive axle 18, which is connected by a splicing sleeve 19 to an axle extension 20. A traction wheel 21 is mounted on the end of the axle extension 20. The wheels 17 and 21 may be secured to the axle 16 and the axle extension 20 by any suitable means whereby driving torque may be transmitted thereto. By removing the splicing sleeve 19, the wheel 21 may be mounted on the axle 18 whereby a conventional tricycle tractor is provided. This is a particularly significant feature of the present invention as an offset tricycle having one wheel widely spaced from the tractor body is required for only certain implements. The user of the tractor at other times prefers to convert his tractor back to a standard tractor for other field operations.

The harvester thresher illustrated consists of a harvester part 22 and a thresher part 23. The harvester part is mounted on the thresher part and may be pivoted thereto for floating adjustment as is well known in harvester thresher construction, both in the self-propelled type and in the trail-behind type of machine. The harvester part extends laterally at each side of the thresher part overlapping the traction wheels 17 and 21 and having gathering means 24 and 25 spaced laterally beyond the tread lines of the traction wheels, whereby the machine may be utilized for straight-through operation; that is, a field of uncut grain may be entered and operations begun without driving over any uncut grain. A cutting mechanism 26, a reel structure 27, a short auger 28, and a relatively longer auger 29 are illustrated as elements of the harvester part of the machine. A conveyer 30 also illustrates means for delivering the grain from the augers 28 and 29 upwardly to the thresher part 23. Any type of well-known harvester construction may be utilized for delivering the grain to a conventional threshing machine as may be embodied in the thresher part 23.

With a machine as shown in the drawings, the weight of the harvester part 22 and a large part of the weight of the thresher part 23 are centered on the rear axle of the tractor. This is preferable as the traction wheels have load-carrying capacity substantially larger than the weight of the tractor due to the necessity for providing large diameter tires of substantial width in order to obtain sufficient traction.

As best shown in Figure 2, the thresher part 23 is provided with an inside bracket 31 at the tractor side thereof. Said bracket has a semicylindrical bearing surface 32 which cooperates with a mating semicylindrical bearing surface 33 formed in a cap 34 hinged at one end by a pin 35 to the bracket 31. The other end of the cap 34 is connected by a swingable bolt 36 to a slotted ear 37 on the bracket 31 to provide a quick detachable connection with the axle housing 15 around with the semi-cylindrical bearing surfaces fit to form a journal about the axle housing.

At the outer side of the thresher part 23, a bracket 38 is secured to form a second support. Said bracket is provided with a semicylindrical bearing face 39 which rotatably fits around the axle extension 20. A cap 40 hinged at one end by a pin 41 to the bracket 38 is provided with a mating semicylindrical bearing face 42 which also engages the axle extension 20 to provide a journal for the bracket 38. A swingable bolt 43 connected to the end of the cap 40 opposite the pin 41 provides means for removably securing cap 40 in position. The bolt 43 extends through a slotted extension 44 on the bracket 38 to provide quick detachable means for releasing the bracket 38 from the axle.

The brackets 31 and 38 are representative of detachable supporting means for carrying the weight of the harvester thresher at two widely spaced points on the tractor structure. Assuming that the weight on the two brackets is somewhat evenly divided, one portion of the weight will be carried closely adjacent the traction wheel 21 on the bracket 38. This point of application of load imposes very little bending load on the axle 18 and the housing 15. The other point of application of load on the bracket 31 is on the housing 15 closely adjacent the rear body portion 13. Said load being applied close to the body structure does not impose any excessive load on the housing structure of the tractor. As to the bending loads on the axles, said load being substantially midway between the two traction wheels is divided evenly and is well within the load-carrying limits of the tractor frame structure and the axles.

The supporting means for one end of the harvester thresher, which due to the arrangement on the tractor constitutes the much greater part of the weight of the machine, has been described. The other end of the machine is supported by supporting means for carrying the other end of the thresher part 23 as will now be described. A transversely extending member 45 is pivotally connected at 46 to a bracket 47 secured to the side of the tractor body 10 adjacent the forward end thereof. Said member is connected at its outer end on a vertical pivot 48 to a steerable wheel spindle 49 on which a wheel 50 is mounted. A steering arm 51 is shown as being connected by a steering link 52 extending toward the tractor. The particular means by which this steering link is connected with the tractor steering mechanism has not been shown as any conventional linkage may be utilized for connecting the steering link so that the wheel 50 is simultaneously steered with the wheels 12 by operation of a steering wheel 53, as illustrated, adjacent an operator's station 54. The harvester part 23 is provided with a downwardly extending bracket 55, as best shown in Figure 2, which is pivotally connected on a longitudinal pivot axis 56 to the member 45. This construction provides a floating support for the end of the thresher part adjacent the front end of the tractor. The journaled connections of the bracket 31 with the axle housing 15 and of the bracket 38 with respect to the axle extension 20 allow the harvester part to tip about the axis of the traction wheel as the wheel 50 rides over obstructions causing vertical shifting of the member 45.

With some frame structures and implements, a modified means of connecting one end of the structure to the tractor may be utilized as shown in Figure 5, the same reference characters being used except for the parts embodying the modification. The thresher part 23 is provided with a bracket 57 which is connected by a removable pin 58 with a bracket 59 secured to the body portion 10 of the tractor. In this modification, three points of support only are provided for the attached implement or similar load-carrying frame structure, two points being provided on the housing structure of the tractor and the other at a laterally spaced point on the extended drive axle of the tractor.

The description of the drawings has included an explanation of the frame structure attaching means on a tractor as constituting the invention. By utilizing an axle extension and a support journaled on a live drive axle, applicant has devised means for supporting a relatively large and heavy implement or similar frame structure upon a tricycle tractor of conventional design without appreciably modifying the tractor and without making any modifications which alter this basic construction or its use as a standard tricycle tractor. It is to be understood that applicant claims as his invention all modifications falling within the scope of the appended claims.

What is claimed is:

1. In combination with a tractor having a narrow body, said body including axle housings of equal length extending from each side of the body at one end thereof, axles of equal length extending from said housings, a traction wheel mounted on one axle, the other axle being provided with an extension, a traction wheel mounted on said extension widely spaced from the body of the tractor, a body structure lying alongside the tractor body and between said tractor body and the widely spaced wheel, and means for supporting one end of the body structure on the tractor including one support journaled directly on the axle extension adjacent the wheel thereon and another support on the axle housing at the side of the tractor adjacent said extension and from which housing the axle extends which is provided with said extension.

2. In combination with a tractor having a narrow body, axle housings of equal length extending from each side of the body at one end thereof, axles of equal length extending from said housings, a traction wheel mounted on one axle, the other axle being provided with an extension, a traction wheel mounted on said extension widely spaced from the body of the tractor, a body structure lying alongside the tractor body and between said tractor body and the widely spaced wheel, means for supporting one end of said structure on the tractor, and means for supporting the other end of the body structure on the tractor including one support journaled directly on the axle extension adjacent the wheel thereon and another support on the axle housing at the side of the tractor adjacent said extension and from which housing the axle extends which is provided with said extension.

3. In combination with a tricycle tractor having a narrow body, axle housings of equal length extending from each side of the body at the rear thereof, axles of equal length extending from said housings, an extension axle secured to one of the axles, a traction wheel mounted on said extension axle widely spaced from the body of the tractor, a load supporting structure lying alongside the tractor body over the extended axle and between said body and said widely spaced wheel, means for supporting one end of said structure on the tractor body, and means for supporting the other end of the load supporting structure including one support on the axle housing at the side of the tractor adjacent said extension and from which housing the axle extends which is provided with said extension and another laterally spaced support journaled directly on the extension axle adjacent the wheel thereon.

4. In combination with a tractor having a narrow body, said body including axle housings of equal length extending from each side of the body at one end thereof, axles of equal length extending from said housings, a traction wheel mounted on one axle, the other axle being provided with an extension, a traction wheel mounted on said extension widely spaced from the body of the tractor, a body structure lying alongside the tractor body and between said tractor body and the widely spaced wheel, and means for supporting one end of said body structure on the tractor including one support journaled on the axle extension adjacent the wheel thereon and another support journaled directly on the axle housing at the side of the tractor adjacent said extension and from which housing the axle extends which is provided with said extension whereby the body structure is pivotally mounted about a transverse axis.

5. In combination with a tricycle tractor having a narrow body, axle housings of equal length extending from each side of the body at the rear thereof, axles of equal length extending from said housings, an extension axle secured to one of the axles, a traction wheel mounted on said extension axle widely spaced from the body of the tractor, a load supporting structure lying alongside the tractor body over the extended axle and between said body and said widely spaced wheel, means for supporting one end of the load supporting structure including one support journaled on one of the axle housings and another laterally spaced support journaled on the extension axle whereby the load supporting structure is pivotally mounted on a transverse axis, and means for supporting the other end of the load supporting structure including a laterally extending member pivoted to the tractor, a wheel on said member and a support on the structure pivotally connected to the member intermediate the ends thereof.

6. In combination with a tractor having a narrow body, a rolling support for the front of said body, axle housing structures extending from each side of the body at the rear thereof, axles extending from said structures, a traction wheel mounted on one axle closely adjacent the body of the tractor, an extension axle secured to the axle at the other side of the body, a traction wheel mounted on said extension axle widely spaced from the body of the tractor, a harvester thresher having the thresher part thereof lying alongside the tractor body and between said body and the widely spaced wheel and extending over the extension axle, the harvester part extending transversely beyond the traction wheels and having cutting mechanism extending outwardly beyond the tread lines of the wheels, means for supporting one end of said thresher part adjacent the front end of the tractor, and means for supporting the other end of the thresher part on the tractor including one support on the axle housing structure at the side of the tractor adjacent said extension and from which housing the axle extends which is provided with said extension and another support journaled on the axle extension.

7. In combination with a tractor having a narrow body, a rolling support for the front of said body, axle housing structures extending from each side of the body at the rear thereof, axles extending from said structures, a traction wheel mounted on one axle closely adjacent the body of the tractor, an extension axle secured to the axle at the other side of the body, a traction wheel mounted on said extension axle widely spaced from the body of the tractor, a harvester thresher having the thresher part thereof lying alongside the tractor body and between said body and the widely spaced wheel, means for supporting one end of said thresher part adjacent the front end of the tractor and means for supporting the other end of the thresher part on the tractor including one support journaled on the axle extension and another support on the axle housing at that side.

8. In combination with a tractor having a narrow body, a rolling support for the front of said body, axle housing structures extending from each side of the body at the rear thereof, axles extending from said structures, a traction wheel mounted on one axle closely adjacent the body of the tractor, an extension axle secured to the axle at the other side of the body, a traction wheel mounted on said extension axle widely spaced from the body of the tractor, a harvester thresher having the thresher part thereof lying alongside the tractor body and between said body and the widely spaced wheel, means for supporting one end of the thresher part on the tractor including one support journaled on the axle extension and another support on the axle housing at that side, and means for supporting the other end of the thresher part including a laterally extending wheel supported member pivoted to the tractor and a support on the thresher part pivoted to said member intermediate the ends thereof.

RUSSEL D. ACTON.

REFERENCES CITED

The following references are of record in the file of this patent:

UNITED STATES PATENTS

| Number | Name | Date |
|---|---|---|
| 1,592,962 | Sample | July 20, 1926 |
| 1,599,196 | Baldwin | Sept. 7, 1926 |
| 1,755,524 | Stanfield | Apr. 22, 1930 |
| 2,212,465 | Baldwin | Aug. 20, 1940 |
| 2,369,745 | Millard et al. | Feb. 20, 1945 |